United States Patent [19]
Hostetler

[11] Patent Number: 5,857,429
[45] Date of Patent: Jan. 12, 1999

[54] POULTRY WATERING SYSTEM

[76] Inventor: Eldon Hostetler, 15110 County Rd. 20, Middlebury, Ind. 46540

[21] Appl. No.: 575,834

[22] Filed: Dec. 20, 1995

[51] Int. Cl.[6] ........................................................ A01K 7/00
[52] U.S. Cl. ............................. 119/72.5; 119/75; 222/422
[58] Field of Search ............................... 119/72, 75, 72.5, 119/71, 51.5; 222/420–422

[56] References Cited

U.S. PATENT DOCUMENTS

| | | |
|---|---|---|
| 29,276 | 7/1860 | Holmes . |
| 1,262,763 | 4/1918 | Farley . |
| 1,454,284 | 5/1923 | Holmes . |
| 1,918,566 | 7/1933 | Sadleir . |
| 2,443,272 | 6/1948 | Sagen . |
| 2,614,531 | 10/1952 | Futterer . |
| 2,910,094 | 10/1959 | Barnes et al. . |
| 2,921,556 | 1/1960 | Nilsen . |
| 2,972,460 | 2/1961 | Kenyon . |
| 3,004,330 | 10/1961 | Wilkins . |
| 3,069,189 | 12/1962 | Hollaender . |
| 3,110,754 | 11/1963 | Witort et al. . |
| 3,187,936 | 6/1965 | Downing . |
| 3,224,797 | 12/1965 | Hausmann et al. . |
| 3,263,652 | 8/1966 | Nakajima et al. . |
| 3,280,530 | 10/1966 | Rothenbach . |
| 3,416,499 | 12/1968 | Wilmot . |
| 3,418,977 | 12/1968 | Godshalk . |

(List continued on next page.)

FOREIGN PATENT DOCUMENTS

| | | |
|---|---|---|
| 924973 | 4/1973 | Canada . |
| 1217098 | 1/1987 | Canada . |
| 0554884A1 | 11/1993 | European Pat. Off. . |
| 2005311 | 4/1969 | France . |
| 3802918 | 8/1988 | Germany . |
| 699538 | 11/1953 | United Kingdom . |
| 923483 | 4/1963 | United Kingdom . |
| 1065924 | 4/1967 | United Kingdom . |

(List continued on next page.)

OTHER PUBLICATIONS

Val Watering Systems Advertisement Mini Time Saver VM100.
Ziggity Systems, Inc. Advertisment Evolution.
Vafac Inc. Advertisment Super Drop.
Farmtek Advertisement Nipple Drinker Systems Grow Bigger, Healthier Birds Faster?.
Ziggity Systems Advertisement No. 1300 E–Z Sip Drinker.
Shenandoah Advertisement—Nipple Drinker System.
Diversified Imports, D.I.V. Co. Advertisement Plasson Cage Cup.

(List continued on next page.)

*Primary Examiner*—John Weiss
*Assistant Examiner*—Dennis Ruhl
*Attorney, Agent, or Firm*—Ryan M. Fountain

[57] ABSTRACT

A poultry watering system includes a fluid conduit integrally formed with a pair of depending flanges. Each flange has a retention ledge depending therefrom and extending toward the other flange. A plurality of openings are provided in the fluid conduit. A flat sealing surface is disposed about the openings. A plurality of poultry drinkers including securement arms are provided. An O-ring is disposed about the top of each drinker. The drinkers are positioned between the flanges such that the inlet of the drinker extends through the opening and the O-ring is adjacent the sealing surface. The drinker is then rotated such that the retention arms are disposed above the ledges. In this manner, the drinker is secured to the fluid conduit and the contact between the O-ring and the sealing surface forms a water-tight seal around the opening. The drinker is also provided with a trigger pin having a tapered segment to properly center the trigger pin and resist leaking of the drinker through undesired displacement of the valve. The system further includes a bracket for joining the conduit of the watering system to a support pipe. The bracket surrounds the support pipe and the conduit and prevents rotation of the conduit. The bracket is secured about the conduit and support pipe by a locking member.

11 Claims, 4 Drawing Sheets

U.S. PATENT DOCUMENTS

| | | |
|---|---|---|
| 3,481,310 | 12/1969 | Alburger . |
| 3,483,847 | 12/1969 | Kneubuehl . |
| 3,523,667 | 8/1970 | Guerrero . |
| 3,526,934 | 9/1970 | Owen, Sr. . |
| 3,537,430 | 11/1970 | Peppler . |
| 3,550,560 | 12/1970 | Edstrom . |
| 3,566,844 | 3/1971 | Occhiodori et al. . |
| 3,582,006 | 6/1971 | Thompson . |
| 3,602,197 | 8/1971 | Fioretto . |
| 3,694,563 | 9/1972 | Monds et al. . |
| 3,698,431 | 10/1972 | Thompson . |
| 3,699,077 | 10/1972 | Spierenburg . |
| 3,716,030 | 2/1973 | Godshalk et al. . |
| 3,724,425 | 4/1973 | Thompson . |
| 3,750,628 | 8/1973 | Schumacher . |
| 3,756,199 | 9/1973 | Clark, IV . |
| 3,856,246 | 12/1974 | Sinko . |
| 3,887,165 | 6/1975 | Thompson . |
| 3,888,461 | 6/1975 | Bron . |
| 3,907,002 | 9/1975 | Gülch . |
| 3,941,157 | 3/1976 | Barnett . |
| 4,086,937 | 5/1978 | Hechler, IV . |
| 4,088,414 | 5/1978 | Fallein . |
| 4,092,997 | 6/1978 | Hansen . |
| 4,185,590 | 1/1980 | Hostetler . |
| 4,221,188 | 9/1980 | Hostetler . |
| 4,258,666 | 3/1981 | Edstrom . |
| 4,269,357 | 5/1981 | Menzel et al. . |
| 4,273,070 | 6/1981 | Hoefelmayr . |
| 4,284,036 | 8/1981 | Hostetler . |
| 4,338,884 | 7/1982 | Atchley et al. . |
| 4,341,182 | 7/1982 | Rustin et al. . |
| 4,370,948 | 2/1983 | Atkins . |
| 4,478,434 | 10/1984 | Little . |
| 4,491,088 | 1/1985 | Hostetler . |
| 4,516,533 | 5/1985 | Mallinson . |
| 4,524,724 | 6/1985 | Steudler, Jr. ............................ 119/72.5 |
| 4,527,513 | 7/1985 | Hart et al. . |
| 4,543,912 | 10/1985 | Steudler, Jr. . |
| 4,589,373 | 5/1986 | Hostetler et al. . |
| 4,600,146 | 7/1986 | Ohno . |
| 4,601,447 | 7/1986 | McFarland . |
| 4,606,301 | 8/1986 | Steudler, Jr. . |
| 4,637,345 | 1/1987 | Hostetler . |
| 4,660,509 | 4/1987 | Steudler, Jr. . |
| 4,669,422 | 6/1987 | Steudler, Jr. . |
| 4,724,797 | 2/1988 | Steudler, Jr. . |
| 4,753,196 | 6/1988 | Lack et al. . |
| 4,770,126 | 9/1988 | Hostettler . |
| 4,790,264 | 12/1988 | Lack et al. . |
| 4,794,881 | 1/1989 | Rader . |
| 4,852,522 | 8/1989 | Uri . |
| 4,884,528 | 12/1989 | Steudler, Jr. . |
| 4,982,699 | 1/1991 | Momont . |
| 5,022,421 | 6/1991 | Johnson . |
| 5,036,891 | 8/1991 | Vogelsang . |
| 5,136,982 | 8/1992 | Steudler, Jr. . |
| 5,154,138 | 10/1992 | Siddiqui et al. . |
| 5,178,079 | 1/1993 | Hostetler . |
| 5,184,570 | 2/1993 | Hostetler . |
| 5,193,485 | 3/1993 | Hostetler . |
| 5,282,440 | 2/1994 | Hostetler . |

FOREIGN PATENT DOCUMENTS

| | | |
|---|---|---|
| 1152819 | 5/1969 | United Kingdom . |
| 1288134 | 9/1972 | United Kingdom . |
| 1321644 | 6/1973 | United Kingdom . |
| 1425395 | 2/1976 | United Kingdom . |
| 1536662 | 12/1978 | United Kingdom . |
| 2 134 765A | 8/1984 | United Kingdom . |
| 2 200 726A | 8/1988 | United Kingdom . |

OTHER PUBLICATIONS

R & C Sales & Mfg., Inc. Advertisement "Stay Dry" Cup.
Clark Products Incorporated Advertisement Clark Valves.
Monoflo International Advertisement Re: Nipples.
Aqua Drop Corp. Advertisement Threaded Nipple Model 737.
Ziggity Systems, Inc. Advertisement E–Z Drinker.
Val Watering Systems Advertisement Mini Drinkers.
Big Dutchman Cyclone, Inc. Advertisement The Val Drinker.
FarmTek Advertisement Nipple Drinkers.
Super Drop Floor Watering System Advertisement.
Lubing Floor Watering System Advertisement.
Star Manufacturing, Inc. Advertisement Nipple Drinkers.
Clark Products Incorporated Advertisement C–9000 Nipple System.
Fox Products Company Advertisement Nipple Valve Watering System.
Impex Advertisement Nipple and Cup Drinking System.

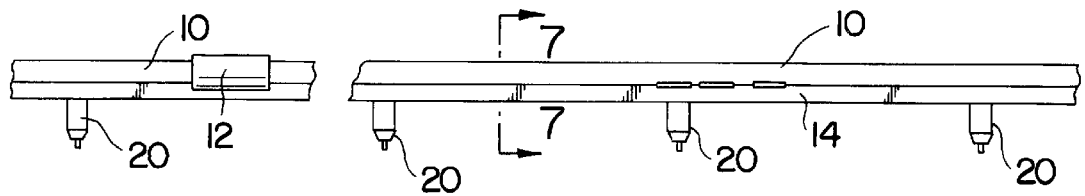
FIG. 1
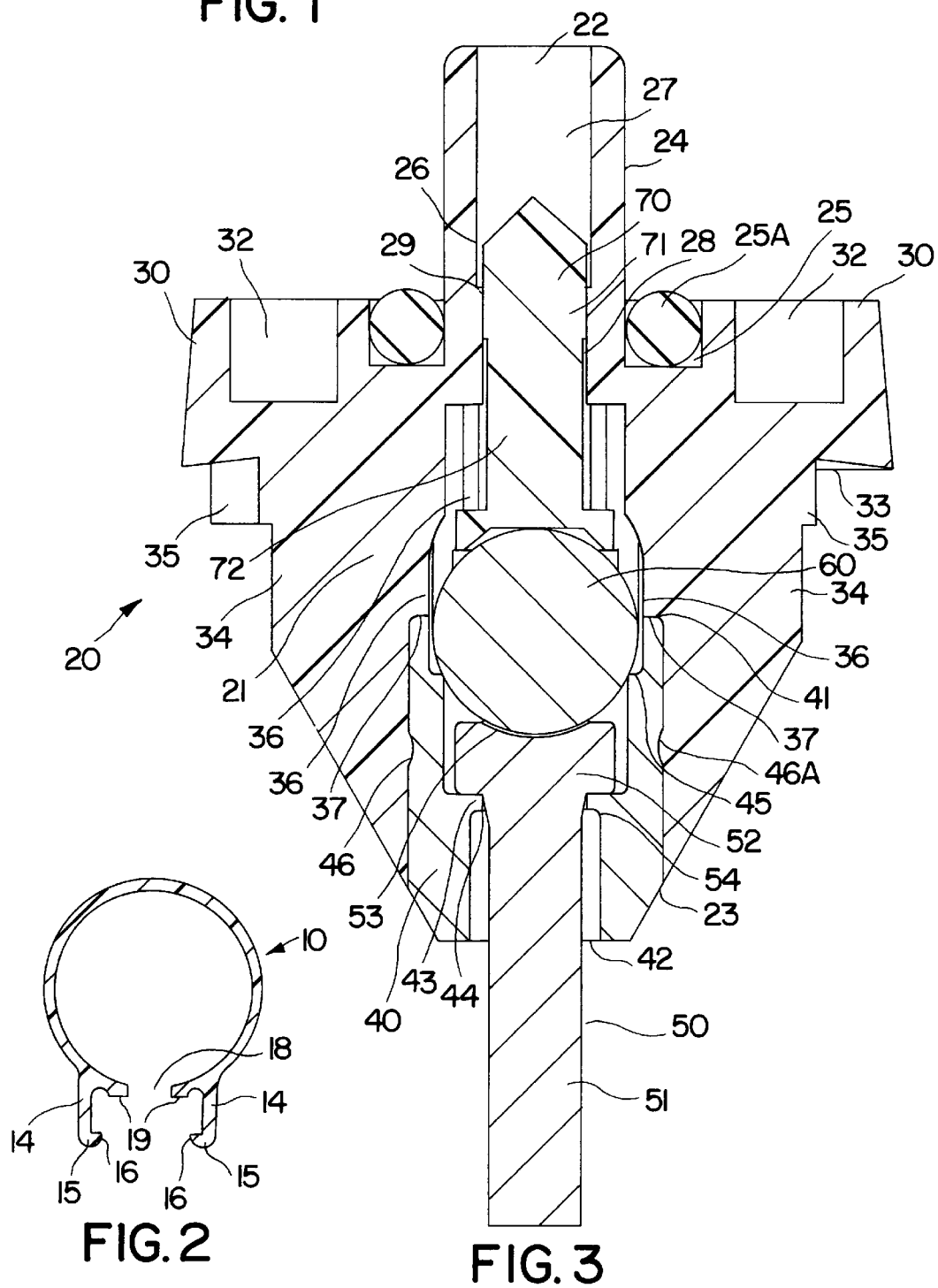
FIG. 2
FIG. 3

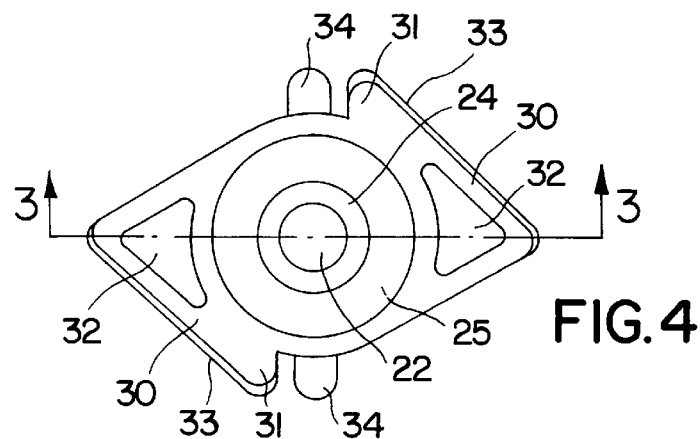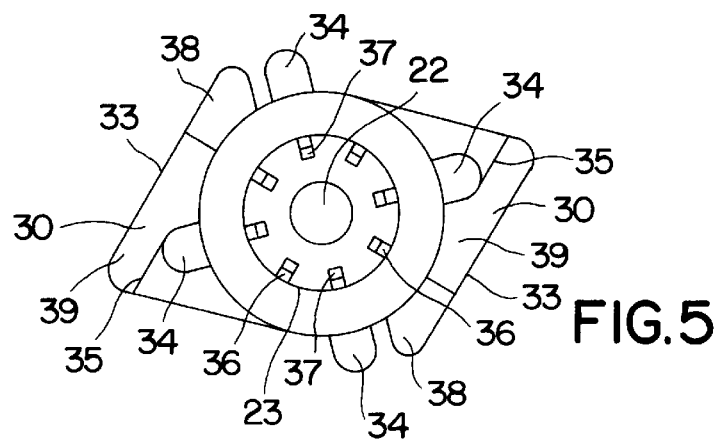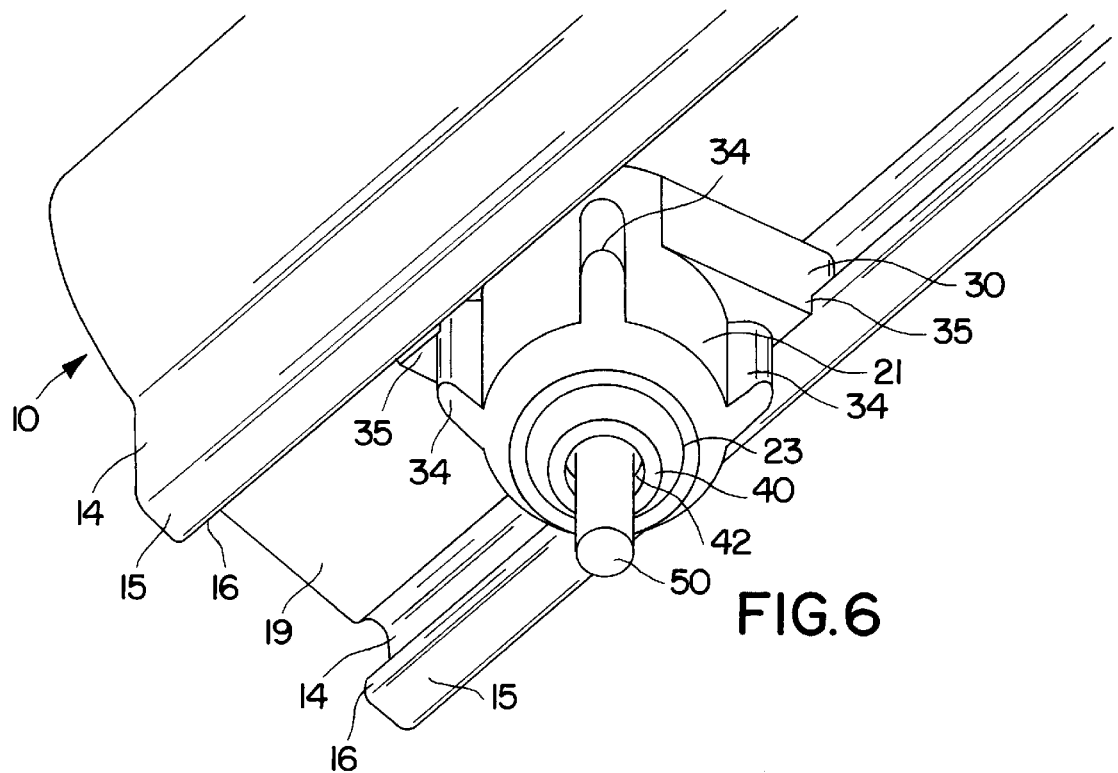

POULTRY WATERING SYSTEM

BACKGROUND AND SUMMARY OF THE INVENTION

The present invention relates to watering systems for poultry and small animals.

Numerous poultry watering systems are known. Some of these systems include one or more fluid conduits suspended above the floor of a poultry house, such as the watering systems shown in U.S. Pat. Nos. 4,221,188 and 4,491,088. Watering devices, such as nipple drinkers or cups, are typically connected to the fluid conduits and are directly actuated by the poultry.

Ultrasonic welding is often used to form fluid tight connections and solid joints between the watering devices and the conduit. For example, nipple drinker saddles are often welded to fluid conduits. An opening in the conduit is aligned with an opening in the saddle. A drinker is then locked into the saddle such that the drinker inlet is in fluid communication with the conduit. Alternatively, the drinker may be connected directly to the conduit, as shown in U.S. Pat. No. 3,669,077.

Once secured to a conduit and in use, it is desirable that the drinkers not leak, as leaking drinkers cause wet litter which can lead to disease in the poultry house. Ideally, the drinker will also be easy for the birds to trigger so as to encourage drinking.

It is an object of the present invention to provide an improved poultry watering system.

Another object of the present invention is to minimize production and assembly costs for poultry watering systems.

Yet another object of the present invention is to decrease the time needed to manufacture a poultry watering system.

Still another object of the present invention is to decrease the number of parts in a poultry watering system.

Yet another object to the present invention is provision of a poultry drinker that resists leaking.

Another object to the present invention is the provision of a poultry drinker that provides quick response time and is relatively easy for poultry to trigger.

These and other objects of the present invention are attained by the provision of a poultry watering system having a fluid conduit, sealing surface on the conduit and a pair of flanges integrally formed on the conduit adjacent the sealing surface. A drinker is in fluid communication with the conduit through an opening in the sealing surface. The drinker includes at least one arm engaged with the flanges so as to secure the drinker to the conduit.

According to another embodiment of the present invention, the drinker includes a projection extending into the opening in the sealing surface. The projection includes a fluid passageway having a first section and a second section, the first and second sections having different cross-sectional areas.

According to another embodiment of the present invention, the drinker further includes at least one stabilizer to resist movement of the drinker while it is attached to the conduit. The stabilizer abuts the sealing surface when the drinker is secured to said conduit.

The objects of the invention are also attained by a watering device having a housing with an inlet and an outlet. The inlet is formed in a projection extending from the housing. A passageway through the projection places the inlet and outlet in fluid communication. The passageway has first and second sections of different cross-sectional areas.

According to another embodiment of the invention, a poultry watering device has an inlet and an outlet and a lip having an opening therethrough that is in fluid communication with the inlet and the outlet. The drinker further includes a valve element for alternatively engaging and disengaging a valve seat. A trigger pin extends through the outlet and includes a tapered portion disposed adjacent the opening in the lip. The trigger pin may further include a head disposed adjacent the tapered section. The head can include a recessed area and rest on the lip. The recessed area may be placed adjacent the valve element.

Objects of the invention are further attained by a bracket for securing a conduit of a poultry watering system to a support pipe. The bracket has a first chamber for receiving the support pipe and a second chamber for receiving the conduit. The second chamber is configured to prevent rotation of the conduit. The bracket is held to the support pipe and conduit by a locking member having a projection extending through an opening in the bracket.

Other objects, advantages and novel features of the present invention will be readily apparent to those skilled in the art upon consideration of the drawings and description below.

BRIEF DESCRIPTION OF THE DRAWINGS

FIG. 1 is a side plan view of a portion of a poultry watering system according to the present invention.

FIG. 2 is a cross-sectional view of a fluid conduit that is a component of a poultry watering system according to the present invention.

FIG. 3 is a cross-sectional view of an assembled poultry drinker that is a component of a poultry watering system according to the present invention.

FIG. 4 is a top plan view of the drinker body shown in FIG. 3.

FIG. 5 is a bottom plan view of the drinker body shown in FIG. 3.

FIG. 6 is a perspective view of the drinker of FIG. 3 inserted in the fluid conduit of FIG. 2.

DETAILED DESCRIPTION OF THE PREFERRED EMBODIMENT

Figure 7:
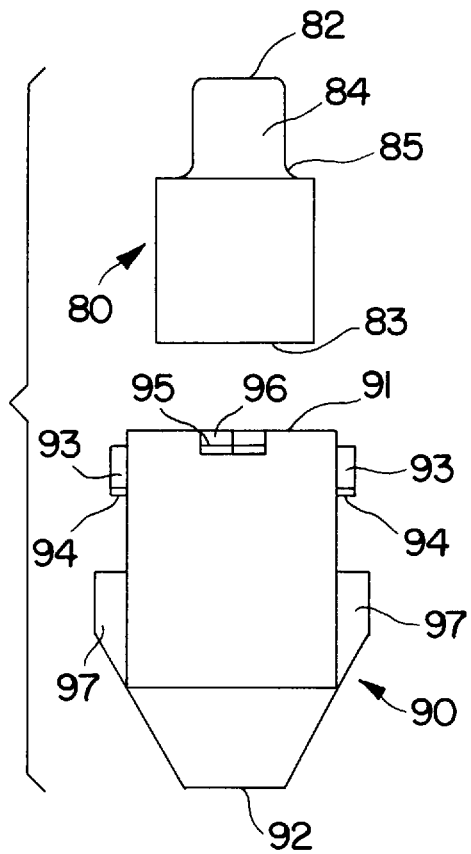
FIG. 7 is a exploded side plan view of an alternative embodiment of a drinker body that is a component of a poultry watering system according to the present invention.

FIG. 1 shows a side plan view of a portion of a poultry watering system having a fluid conduit 10 with a plurality of nipple drinkers 20 secured thereto. Individual sections of conduit 10 are joined at their ends by connector 12 as described below. Multiple sections of conduit 10 are joined so as to form a watering line of the desired length. As is commonly known in the industry, a fluid supply source, typically including a pressure regulator, is coupled to one end of the watering line. One such fluid regulator is shown in U.S. Pat. No. 4,344,465. The opposite end of the watering line would be provided with a device for draining or flushing water from the system. Typically, a manually operated valve would be used. However, the automatic flush device shown in U.S. Pat. No. 5,136,983 is preferred.

As with prior systems, poultry watering systems according to the present invention are typically suspended above the floor of the poultry house during use. Alternatively, the system may be utilized with cage systems in which poultry are housed in cages, rather than allowed to roam freely about the poultry house. If so, the conduit is placed adjacent the cages such that the drinkers are located near or extend into the cages so to be accessible by the poultry. Each section of conduit 10 includes a pair of mounting flanges 14, between which drinkers 20 are secured as described below.

Turning to FIG. 2, each mounting flange 14 extends generally downwardly from fluid conduit 10. At the lower end of each flange 14, an inwardly extending retention ledge 15 having an inner edge 16 is provided. Each ledge 15 preferably faces the other across the bottom of fluid conduit 10. Spaced along the bottom of fluid conduit 10 approximately every 8–12 inches are openings 18. Fluid conduit 10 further includes a substantially flat sealing surface 19 disposed between mounting flanges 14. Sealing surface 19 may extend the length of fluid conduit 10. Sealing surface 19 cooperates with nipple drinkers 20 as described below to provide a fluid tight seal around openings 18.

Each drinker 20 includes a housing or body 21 and insert 40 (FIGS. 3–5). Body 21 includes an inlet 22 at one end thereof and is open at the opposite end 23. Body 21 further includes a generally vertically extending projection 24. Projection 24 is narrower than the remainder of body 21 and has a recess 25 about its base. Recess 25 accommodates an O-ring 25A. Body 21 further includes a passageway 26 placing inlet 22 in communication with open end 23. Passageway 26 includes a first section 27 and a second section 28 separated by a lip 29. Second section 28 has a smaller cross-sectional area than first section 27. As described below, passageway 26 makes the drinker compatible with the two-stage metering pin of U.S. Pat. No. 5,193,485. Body 21 further includes two retention arms 30 for securing drinker 20 to conduit 10 as described below. Each retention arm 30 extends out beyond the central portion of body 21 on opposite sides thereof and terminates in a projection at 31. A recessed area 32 is formed in each retention arm 30. One side of each retention arm 30 slopes outward slightly with distance from the top of body 21 such that its lower edge 33 extends farther outward from the center of body 21 then the upper edge. A plurality of fingers 34 are provided on body 21 to accommodate tooling used to secure drinker 20 to conduit 10. On the underside of each retention arm 30, extending below edge 33, is a stop member 35. Stop member 35 is, in the embodiment shown, generally parallel with edge 33 of retention arms 30 and spaced back from edge 33. Body 21 further includes a plurality of projections 36 extending from the interior wall thereof and terminating at free ends 37. Projections 36 center a ball valve 60, as described below. Ends 37 act as a positioning means for insert 40. The underside of each projection 31 includes an inclined surface 38 that slopes upwardly until leveling off in a generally flat surface 39.

Insert 40 is open at its first end 41 and opening 23 of body 21 and of insert 40 are sized such that insert 40 may be inserted in body 21. Insert 40 includes an outlet 42 at the opposite end. Thus, when insert 40 is inserted in body 21, inlet 22 and outlet 42 are in fluid communication through body 21 and insert 40. Insert 40 further includes a lip 43 having an opening 44 therethrough. A seat 45, against which ball valve 60 seals, is located above lip 43. Insert 40 further includes a groove 46 that mates with a corresponding projection 46A in body 21.

A trigger pin 50 having a shaft 51 and a head 52 extends through opening 44 such that head 52 rests on lip 43. Trigger pin 50 further includes a recessed area or dimple 53 in head 52 and a tapered segment 54 between head 52 and shaft 51. Tapered portion 52 is dimensioned at its upper end to be just slightly narrower than opening 44. Tapered portion 54 then tapers inwardly, terminating in the upper end of shaft 51.

A metering pin 70, which may be a two-stage metering pin as disclosed in U.S. Pat. No. 5,193,485, is also utilized. Such a metering pin has first segment 71 and a second segment 72. Second segment 72 has a smaller cross-sectional area than first segment 71.

To assemble drinker 20, metering pin 70 is inserted in passage 27 of body 21 such that it extends out of inlet 22. Metering pin 70 may be made of plastic and flash may be provided on the portion of metering pin 70 extending from outlet 22. The flash will retain metering pin 70 in inlet 22 during the remainder of assembly. Trigger pin 50 is then inserted through opening 44 in insert 40. Ball valve 60 is then placed on seat 45 of insert 40 and body 21 with metering pin 70 therein is pressfit over ball valve 60, insert 40 and trigger pin 50. When insert 40 is in the proper position, it will rest against free ends 37 of projections 36 and projection 46A will engage groove 46.

As is known in the art, when a bird pecks or lifts trigger pin 50, ball valve 60 is unseated from seat 45 and water flows through the drinker and out outlet 42. As describe in the above-referenced two-stage metering pin patent, the rate of flow into the drinker will be controlled by the separation distance between the metering pin and the sidewalls of the passageway in which the metering pin is located. Thus, in the drinker of the present invention, when trigger pin 50 is actuated such that first segment 71 of metering pin 70 remains adjacent lip 29, the space between first segment 71 and lip 29 controls the rate of flow into the drinker. Alternatively, if trigger pin 50 is actuated such that second segment 72 of metering pin 70 is adjacent lip 29 and first segment 71 is entirely above lip 29, a larger space will be provided between second segment 72 and lip 29, thereby allowing increased water flow into the drinker.

Trigger pin 50 is self centering within opening 44. That is, when trigger pin 50 is inserted through opening 44, tapered segment 54 will ride along lip 43 so that trigger pin 50 will be centered in opening 44. In this manner, head 52, and therefore dimple 53, will be properly centered to receive ball 60. If trigger pin 50 were able to rest in opening 44 off center, head 52 and dimple 53 would be shifted with respect to ball 60. This would result in ball 60 being raised, as it would be positioned farther up on the curvature of dimple 53. Ball 60 would thus be raised off seat 45, thereby allowing drinker 20 to leak. This is particularly possible when a metal insert 40 or seat 45 is used. With the arrangement of the present invention, it is possible to successfully utilize a metal seat and lower ball 60 with respect to dimple 53. This results in lesser response time from triggering to watering of the poultry. The amount of force needed to trigger the drinker is also reduced.

To assemble a watering system of any desired length, connectors 12 are inserted over adjacent ends of sections of fluid conduit 10, after interfering portions of mounting flanges 14 are cut away. Connectors 12 preferably include conventional fluid sealing means therein so that no leakage occurs at the connection.

Drinkers 20 are then secured to conduit 10. An O-ring 25A is first placed about projection 24 in recess 25. Projection 24 is then inserted in an opening 18 in conduit 10 until O-ring 25A comes in contact with sealing surface 19. Drinker 20 is positioned such that retention arms 30 are between inner edges 16 of ledges 15. Drinker 20 is then rotated such that the lower most edges of inclined surfaces 38 are positioned above retention ledges 15 of flanges 14. Drinker 20 is then further rotated such that inclined surfaces 38 ride along retention ledges 15 until the uppermost portion of inclined surfaces 38 are above ledges 15. At this point, flat surfaces 39 on the undersides of securement arms 30 rotate into place above ledges 15 of flanges 14. Rotation can continue until stop members 35 strike inner edges 16 of ledges 15. Securement arms 30 are then in position above ledges 15 of flanges 14. In this manner, O-ring 25A is compressed against sealing surface 19 and drinker 20 is secured to conduit 10. FIG. 6 shows a drinker 20 secured in conduit 10.

Figure 8:
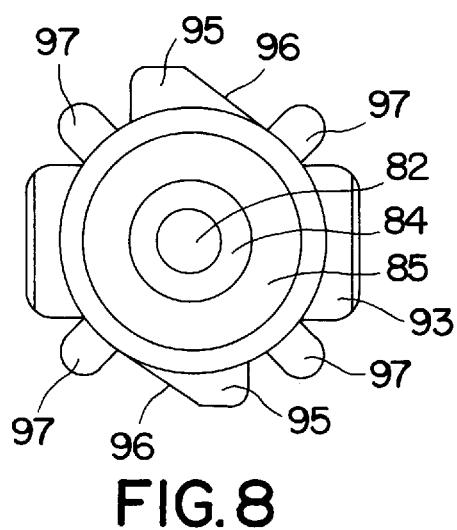
FIG. 8 is a top plan view of the body shown in FIG. 7 in its assembled position.

FIGS. 7 and 8 show an alternative embodiment of a drinker according to the present invention. In this embodiment, the body or housing is comprised of an upper chamber 80 and a lower chamber 90. Upper chamber 80 includes an inlet 82 at one end thereof and is open at the opposite end 83. A projection 84 extends from chamber 80 and has a shoulder 85 disposed thereabout. An O-ring may be placed around projection 84 and rest on shoulder 85. A passageway extends through projection 84 having a dual cross sectional area and a lip as described in conjunction with the previous embodiment.

Lower housing 90 is open at first end 91 such that upper housing 80 may be inserted therein. Lower housing 90 further includes an outlet 92 at the opposite end. Thus, when upper housing 80 is inserted in lower housing 90, inlet 82 and outlet 92 are in fluid communication through upper housing 80 and lower housing 90. Lower housing 90 also includes two retention arms 93, the lower edges of which angle upwardly toward housing 90. Retention arms 93 may be provided with inclined surfaces 94 on each side thereof. Surfaces 94 slope downward toward the center line of housing 90. Note that retention arms 93 are of a different configuration than retention arms 30 of the previous embodiment. Lower housing 90 further includes a pair of stabilizers 95, each of which includes an inclined surface 96. Inclined surfaces 96 provide clearance for stabilizers 95 between inner edges 16 of retention ledges 15. A plurality of fingers 97 are also provided for accommodating tooling as described above. The interior of upper housing 80 and lower housing 90 are both configured so as to accommodate trigger pin, ball valve, seat and metering pin arrangements that are known in the art. One such arrangement is shown is U.S. Pat. No. 5,327,853. Alternatively, a trigger pin having a tapered segment, like that of trigger pin 50 shown above, may be utilized with this drinker embodiment.

FIG. 8 shows a top plan view of upper housing 80 inserted in lower housing 90, without the metering pin, ball valve, seat and trigger pin arrangement. The drinker of this embodiment is secured to conduit 10 in the same manner as previously described. When properly in place, stabilizers 95 will be generally aligned along the longitudinal axis of conduit 10, thereby resisting tilting of the drinker.

Figure 9:
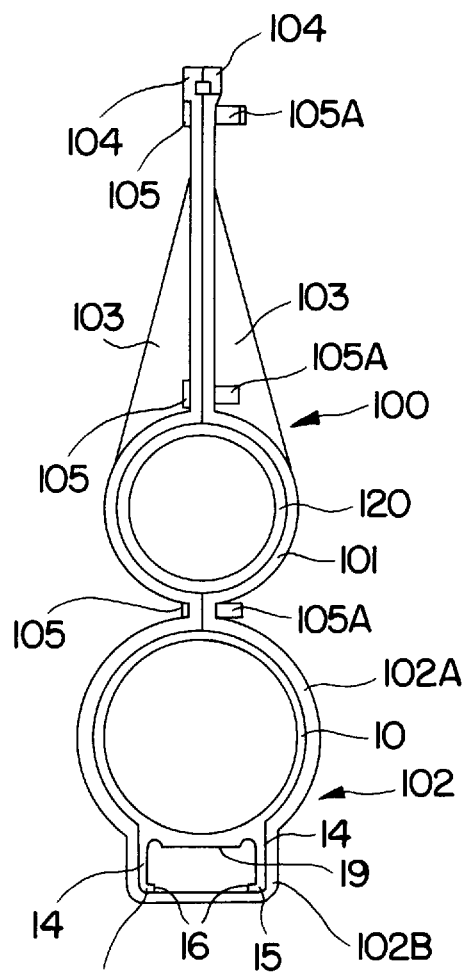
FIG. 9 is an end view of a connecting bracket that forms a component of a poultry watering system according to the present invention joining the fluid conduit of FIG. 2 to a support pipe.
Figure 10:
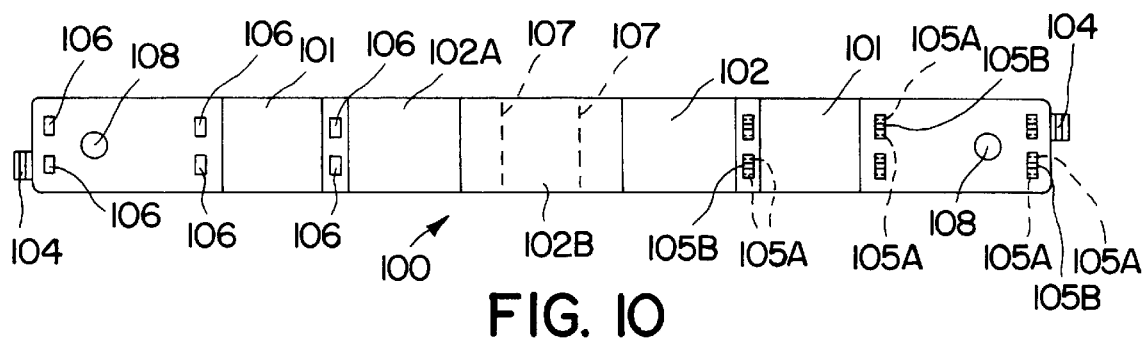
FIG. 10 is a top plan view of the bracket shown in FIG. 9 in its unassembled position.
Figure 11:
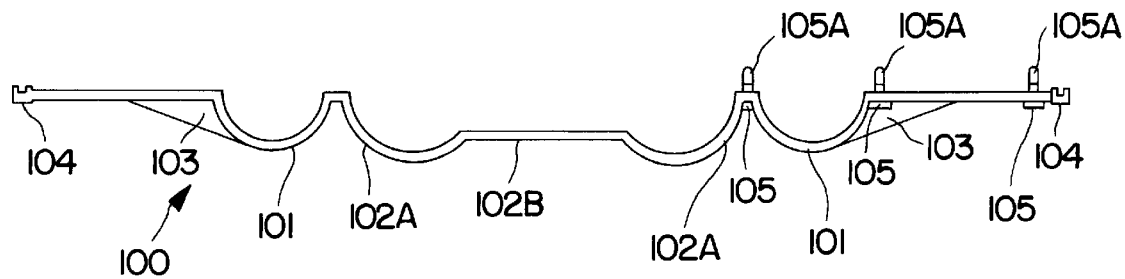
FIG. 11 is a side plan view of FIG. 10.

FIGS. 9–11 show a connecting bracket that may be used to join fluid conduit 10 to a support pipe 120. Bracket 100 includes a first chamber 101 and a second chamber 102.

Figure 12:
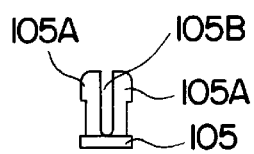
FIG. 12 is a plan view of a lock for securing the bracket shown in FIGS. 10 and 11 as shown in FIG. 9.

Chamber 101 is generally circular. The upper portion 102A of chamber 102 also has a generally circular configuration. However, the lower portion 102B of chamber 102 terminates in a squared-off portion configured to follow the outer contour of flanges 14 of conduit 10. Thus, the configuration of lower chamber 102 is such that conduit 10 will not rotate within chamber 102. Flanges 103 may be provided on bracket 100 to provide additional support. The upper end of bracket 100 can include guides 104 for receiving an electrified anti-roosting wire designed to keep birds from sitting on the drinking system. As shown in FIGS. 10 and 11, bracket 100 may be molded as a single plastic piece. Bracket 100 is then folded about support pipe 120 in conduit 10 along living hinges 107. Bracket 100 is secured together by locks 105 extending through openings 106. Each lock 105 (FIG. 12) includes a pair of projections 105A separated by a gap 105B. The distance from the outermost edge of one projection 105A to the outermost edge of its corresponding projection 105A is wider than the width of openings 106. When bracket 100 is folded and projections 105A are forced through holes 106, they flex inwardly into gap 105B. Once they have extended their full distance through openings 106, projections 105A spring back to a width greater than that of opening 106, thereby preventing removal. Although FIG. 12 shows a lock 105 separated from bracket 100, it should be understood that locks 105 may be made separately or molded with bracket 100.

The poultry system could be suspended by running a cable through openings 108. Alternatively, bracket 100 can be used simply to join the conduit to the support pipe and other known brackets can be used to suspend the system.

Although the present invention has been described above in detail, the same is by way of illustration and example only. Those skilled in the art will now recognize that various modifications can be made to produce other embodiments of the present invention. For example, if the system according to the present invention is to be suspended from the ceiling of a poultry house, conduit 10 may be formed with a support channel and hanger flange as shown and described in U.S. Pat. No. 5,178,079 and U.S. Pat. No. 5,282,440. Additionally, trigger pin 50 having tapered section 54 can be utilized with other configurations of drinker bodies and seats than those disclosed. Bracket 100, locks 105 and openings 106 can also have configurations different from those shown. Accordingly, the spirit and scope of this invention are limited only by the terms of the following claims.

What is claimed:

1. A saddleless nipple drinker system comprising:
   a fluid conduit,
   at least one flange extending from the fluid conduit,
   a nipple drinker having an inlet, an outlet and a valve for controlling fluid flow between the inlet and the outlet,
   means connected to the nipple drinker for rotatably attaching the nipple drinker to the flange.

2. The saddleless nipple drinker system according to claim 1 wherein the conduit and nipple drinker include means for establishing a fluid-tight seal therebetween when the nipple drinker is rotatably attached to the flange.

3. The saddleless nipple drinker system according to claim 2 wherein the nipple drinker encloses the valve when the nipple drinker is not attached to the flange and the nipple drinker includes a projection that penetrates the conduit when the nipple drinker is attached to the flange.

4. The saddleless nipple drinker system according to claim 3 wherein the conduit includes an opening for receiving the projection and a flattened surface adjacent the opening, and the nipple drinker includes a sealing surface adjacent the projection for fluid-tight sealing engagement with the flattened surface of the conduit when the nipple drinker is attached to the flange.

5. In a poultry watering system having at least one fluid conduit and a plurality of drinkers attached to the conduit to control the flow of water to poultry, each of the drinkers including an inlet and an outlet and enclosing a valve member between the inlet and outlet, the method of removably attaching the drinkers to the conduit without the use of drinker saddles comprising:

providing a pair of spaced-apart flanges along a length of the conduit that are integrally formed with the conduit, providing a plurality of openings in the conduit between the flanges, providing a pair of arm means attached to opposing sides of each drinker for rotably retaining the drinkers to the flanges, then inserting the drinkers between the flanges at locations adjacent the openings, and then rotating the drinkers through an arc of motion such that the arm means of each drinker are each removably retained by a flange.

6. The invention according to claim 5 wherein the flanges are each provided with a ledge portion directed toward the opposing flange and the arm means are configured such that rotation of the drinkers toward a retained position causes the ledges to urge the drinkers toward the conduit.

7. The invention according to claim 6 wherein the drinkers are each provided with stop means for limiting the arc of motion.

8. The invention according to claim 7 wherein the linear distance between the extremities of the ledges is formed to be less than the linear distance between the extremities of the arm means.

9. The invention according to claim 8 wherein the conduit is provided with a substantially flat surface between the flanges and adjacent each of the openings and the drinkers are each provided with seal means adjacent to the inlet for forming a fluid-tight seal against the flat surface.

10. The invention according to claim 9 wherein each drinker is provided with penetrating means for entering the opening when the arm means are retained by the flanges and defining a fluid flow path between the conduit and the inlet.

11. The invention according to claim 10 wherein the drinkers are each provided with projections thereon to facilitate manipulation of the drinker through the arc of motion.

* * * * *